United States Patent [19]

Mizrahi et al.

[11] Patent Number: 5,636,304

[45] Date of Patent: Jun. 3, 1997

[54] ARTICLE COMPRISING A SPATIALLY VARYING BRAGG GRATING IN AN OPTICAL FIBER

[75] Inventors: Victor Mizrahi, Bedminster; Linn F. Mollenauer, Colts Neck, both of N.J.

[73] Assignee: Lucent Technologies Inc., Murray Hill, N.J.

[21] Appl. No.: 538,166

[22] Filed: Aug. 23, 1995

Related U.S. Application Data

[63] Continuation of Ser. No. 235,958, May 2, 1994, abandoned, which is a continuation of Ser. No. 995,492, Dec. 23, 1992, Pat. No. 5,363,239.

[51] Int. Cl.[6] ............................................. G02B 5/08
[52] U.S. Cl. ........................... 385/37; 385/13; 359/3; 359/34; 359/570; 359/575
[58] Field of Search ..................................... 385/12, 13, 37; 372/6, 96; 359/3, 8, 34, 570, 575, 577

[56] References Cited

U.S. PATENT DOCUMENTS

| | | | |
|---|---|---|---|
| 3,909,110 | 9/1975 | Marcuse | 385/124 |
| 4,093,338 | 6/1978 | Bjorklund et al. | 359/900 |
| 4,725,110 | 2/1988 | Glenn et al. | 359/3 |
| 4,807,950 | 2/1989 | Glenn et al. | 359/34 |
| 4,953,939 | 9/1990 | Epworth | 385/15 |
| 5,007,705 | 4/1991 | Morey et al. | 385/12 |
| 5,237,576 | 8/1993 | DiGiovanni et al. | 372/6 |
| 5,257,273 | 10/1993 | Farries et al. | 372/102 |
| 5,305,336 | 4/1994 | Adar et al. | 372/96 |
| 5,351,321 | 9/1994 | Snitzer et al. | 385/10 |
| 5,367,588 | 11/1994 | Hill et al. | 385/37 |
| 5,384,884 | 1/1995 | Kashyap et al. | 385/129 |
| 5,388,173 | 2/1995 | Glenn | 385/37 |
| 5,400,422 | 3/1995 | Askins et al. | 385/37 |
| 5,461,687 | 10/1995 | Brock | 385/37 |

OTHER PUBLICATIONS

G. Meltz, et al., "Formation of Bragg Gratings in Optical Fibers by a Transverse Holographic Method", Optics Letters, vol. 14, No. 15, 1 Aug. 1991, pp. 823–825.

H. G. Park, et al., "Intermodal Coupler Using Permanently Photoinduced Grating in Two–Mode Optical Fibre", Electronics Lett. vol. 25, No. 12, 8 Jun. 1989, pp. 797–798.

F. Ouellette, "Dispersion Cancellation Using Linearly Chirped Bragg Grating Filters in Optical Waveguides", Optics Letters, vol. 12, No. 10, Oct. 1987, pp. 847–849.

K. O. Hill, et al., "Photosensitivity in Optical Fiber Waveguides: Application to Reflection Filter Fabrication," Appl. Phys. Lett; vol. 32, No. 10, 15 May 1978, pp. 647–649.

M. C. Farries et al., "Broadband Chirped Fibre Bragg Filters for Pump Rejection and Recycling in Erbium Doped Fibre Amplifiers," Electron. Lett. 28 (27 Feb. 1992) 487–489.

I. Bennion et al., "High–Reflectivity Monomode–Fibre Grating Filters," Electron. Lett. 22 (13 Mar. 1986) 341–343.

A. Katzir et al., "Chirped–grating output couplers in dielectric waveguides," Appl. Phys. Lett. 30 (Mar. 1977) 225–226.

A. Katzir et al., "Chirped Gratings in Integrated Optics," IEEE J. Quantum Electron. QE–13 (Apr. 1977) 296–304.

P. A. Morton et al., "Mode–Locked Hybrid Soliton Pulse Source with Extremely Wide Operating Frequency Range," IEEE Photon. Tech. Lett. 5 (Jan. 1993) 28–31.

*Primary Examiner*—Paul M. Dzierzynski
*Assistant Examiner*—John Juba, Jr.
*Attorney, Agent, or Firm*—Martin I. Finston

[57] ABSTRACT

A method for forming a grating in a photosensitive medium such as a photosensitive optical fiber. The method comprises impinging a pair of interfering, actinic beams onto the medium, and during the impinging step, advancing the illuminated portion of the interference pattern relative to the medium. The advancement is carried out without changing the phase, or registration, of the interference pattern. According to one embodiment of the invention, a grating having a spatially dependent period is produced by varying the wavelength or the intersection angle of the actinic beams during the advancement. According to a second embodiment of the invention, a grating having a spatially dependent refractive index perturbation is produced by varying the dose of actinic radiation received by the medium during the advancement.

1 Claim, 2 Drawing Sheets

ARTICLE COMPRISING A SPATIALLY VARYING BRAGG GRATING IN AN OPTICAL FIBER

This application is a continuation of application Ser. No. 08/235,958, filed on May 2, 1994, now abandoned, which is a continuation of application Ser. No. 07/995,492 filed Dec. 23, 1992, now U.S. Pat. No. 5,363,239.

FIELD OF THE INVENTION

This invention pertains to the processing of photosensitive materials to form optical elements, and more specifically to the formation of passive optical components that are integrated with waveguiding articles such as optical fibers.

ART BACKGROUND

Along with photoresists and the like, certain optical media, including at least some silica-based optical fibers, can be modified by exposure to electromagnetic radiation in an appropriate spectral range. (Such radiation, typically ultraviolet radiation, is referred to below as "actinic" radiation.) That is, exposure of a photosensitive optical fiber (or other optical medium) to actinic radiation may cause the refractive index to change in the exposed portion of the medium. A periodic pattern can be imposed on the impinging radiation by, e.g., superimposing a pair of beams of substantially monochromatic radiation from, e.g., a laser, to create an interference pattern. If two beams of wavelength $\lambda$ intersect at an intersection angle $\phi$, the resulting interference pattern will have a period $\Lambda$ given by $$\Lambda = 0.5\lambda csc\frac{\phi}{2}$$

When such a patterned radiation field impinges on an optical fiber or other optical waveguide having a core of the appropriate photosensitivity, a corresponding pattern is imposed on the core in the form of periodic (or quasiperiodic) fluctuations in the core refractive index. Such a pattern, which is often referred to as a "Bragg grating" or a "distributed Bragg reflector (DBR)" can behave as a spectrally selective reflector for electromagnetic radiation. Bragg gratings formed in this manner are particularly useful as end-reflectors in optical fiber lasers. These Bragg gratings are useful both because they are spectrally selective, and because they are readily incorporated in the same optical fiber that supports the active laser medium.

A technique for creating these Bragg gratings is described in U.S. Pat. No. 4,725,110, issued to W. H. Glenn, et al. on Feb. 16, 1988, and U.S. Pat. No. 4,807,950, issued to W. H. Glenn, et al. on Feb. 28, 1989. An optical fiber laser having a DBR-terminated cavity is described in G. A. Ball and W. W. Morey, "Continuously turnable single-mode erbium fiber laser", *Optics Lett.* 17 (1992) 420–422.

Bragg gratings are useful as passive optical components for other applications besides end-reflectors in fiber lasers. For example, Bragg gratings are useful as spectral filters for wavelength-division multiplexing and other optical signal-processing applications. An optical filter which comprises a Bragg grating formed in an optical fiber is described in U.S. Pat. No. 5,007,705, issued to W. W. Morey, et al. on Apr. 16, 1991.

Similar techniques are useful for forming a grating pattern in a photosensitive medium such as a photoresist overlying a substrate. The substrate is lithographically processed after exposure and development of the resist.

For some applications, it is desirable to provide a Bragg grating that is quasiperiodic instead of periodic. That is, the period of the grating (i.e., the linear distance, along the propagation axis, between successive peaks or valleys of the refractive index profile) is not a constant, but instead changes in a predetermined fashion along the propagation axis. The most common quasiperiodic grating is one in which the period increases or decreases as a function, typically an approximately linear function, of position along the propagation axis. Such a grating is referred to as a "chirped" grating. Chirped gratings are useful, inter alia, for making broad-band optical reflectors. An application of chirped gratings in optical fiber communication lasers is described in co-pending U.S. patent application Ser. No. 07/827,249, filed by R. Adar et al. on Jan. 29, 1992 continued as Ser. No. 08/015,664, now U.S. Pat. No. 5,305,266. An application of chirping to remove undesirable structure from grating reflectivity spectra is described in the co-pending U.S. patent application entitled "Method for Forming Distributed Bragg Reflectors in Optical Media", filed by V. Mizrahi et at.

In the conventional method for making chirped gratings (in photoresists), the interfering beams that impinge upon the photosensitive medium are not collimated. Instead, each is made to diverge at a predetermined divergence angle. As a consequence of the divergence of the beams, there lacks a single, well-defined angle of intersection between the beams. Instead, there is an effective angle of intersection that depends upon position (measured along the propagation axis of the photosensitive medium) within the interference pattern. As a result, a grating is formed that has a spatially dependent period. This method is described in X. Mai, et al., "Simple versatile method for fabricating guided-wave gratings", *Appl. Optics*, 24 (1985) 3155–3161.

This conventional method is disadvantageous because it cannot be used to make a grating in which the period has an arbitrary spatial dependence. Instead, this dependence can only take a form that is accessible by the method of diverging the beams.

SUMMARY OF THE INVENTION

We have discovered a new method for making gratings, such as Bragg gratings, having spatially dependent periods. In contrast to prior art methods, the period can be independently specified in different portions of the grating. As a result, a broad range of functional forms can be specified for the spatial dependence.

In one embodiment, the invention involves a method for forming a grating along an axis, to be referred to as an "optical propagation axis", by exposing a photosensitive medium. The direction of this axis is referred to herein as the "axial" direction. The method includes the step of producing two collimated, non-collinear beams of electromagnetic radiation having an actinic wavelength $\lambda$, i.e., a wavelength capable of inducing refractive index changes in the medium. The two beams are impinged on at least a portion of the medium at an intersection angle $\phi$, such that a periodic interference pattern is created on the impinged portion. The method further includes the step of advancing the illuminated portion of the interference pattern relative to the medium such that at least local coherence of the interference pattern is preserved. The method further includes, during the advancing step, the step of changing the product $$\lambda \times 0.5 \, csc \frac{\phi}{2},$$

such that the interference pattern has a spatially varying period.

In a second embodiment of the invention, a Bragg grating is formed by producing interfering, actinic beams, impinging them on a photosensitive optical medium, and advancing the illuminated portion of the interference pattern relative to the medium, as recited above, resulting in formation of a refractive index perturbation in the medium. The inventive method, in this embodiment, further includes, during the advancing step, varying the dose of actinic radiation received by the various points of the resulting refractive index perturbation. As a result of this variation, the average amplitude of the perturbation is made to vary, in the axial direction, according to a predetermined pattern. The "average" amplitude in this sense is the spatially-dependent amplitude averaged over many, e.g. 10, grating periods.

DETAILED DESCRIPTION OF A PREFERRED EMBODIMENT

For simplicity, the following discussion will be directed to forming a Bragg grating in an optical fiber. It should be noted, however, that gratings can be formed in other optical media either by direct exposure or by exposure of a photoresist followed by conventional lithographic processing. We intend to include these alternative media within the scope of the invention, and to include, in addition to Bragg gratings, other types of gratings such as reflection gratings.

We have found it advantageous to create the interference pattern using a scanning interferometer of a design in which the translation of a single, translatable mirror can advance the position of the illuminated portion of the interference pattern along the fiber, or other photosensitive medium, while preserving its registration, i.e., without changing the phase of the interference pattern. The fiber or other medium is kept stationary and the mirror is translated during exposure of, e.g., the fiber. As a consequence, a refractive index perturbation is readily created in, e.g., the fiber having a greater axial extent than the illuminated portion itself.

Figure 1:
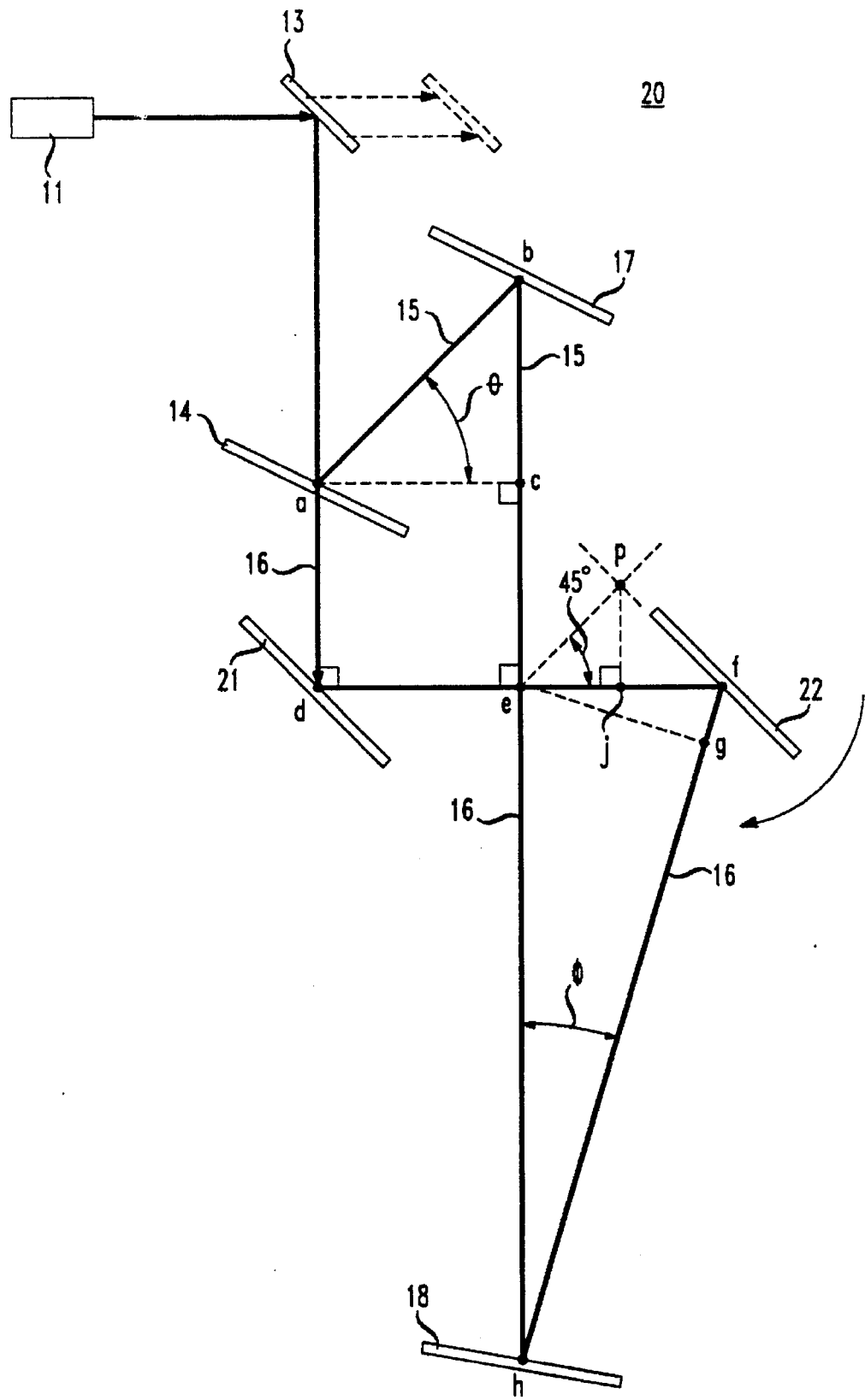
FIG. 1 is a schematic, optical diagram of an interferometer useful for practicing the invention, in one embodiment.

A currently preferred interferometer 20 for carrying out such exposures is depicted in FIG. 1, and is described in detail in U.S. Pat. No. 4,093,338, issued to G. C. BjorKlund, et al. on Jun. 6, 1978. The optical arrangement of this interferometer includes laser source 11, translatable mirror 13, rotatable mirror 22, and mirrors 14, 17, and 21. The interfering beams converge on photosensitive medium 18, which is exemplarily an optical fiber. The illuminated portion of the interference pattern is shifted (without affecting its phase) along the fiber by translating mirror 13. The period of the interference pattern is determined by the actinic wavelength, and by the rotational position of rotatable mirror 22.

According to a preferred method for making the Bragg gratings, the fiber is first clamped into position to assure that the regions to be exposed are straight. The fiber is subjected to an effective exposure of radiation, typically ultraviolet light. Various appropriate sources of ultraviolet light are available and known to those skilled in the art.

By way of illustration, we have found that an excimer-pumped, frequency doubled, tunable dye laser emitting at about 245 nm is an appropriate exposure source. The use of such an exposure source is described in co-pending U.S. patent application Ser. No. 07/878791, filed on May 5, 1992 by D. J. DiGiovanni, et al., and now U.S. Pat. No. 5,237,576, which we hereby incorporate by reference. As discussed therein, this exposure source is useful for making gratings in highly erbium-doped, silica-based optical fibers. These fibers are typically exposed to 2-mJ pulses at a repetition rate of 20 pulses per second. A cylindrical lens focuses the laser light into a band about 0.5 cm long and 100–200 µm wide. Typical exposures are about 30 seconds in duration. By that method, Bragg gratings are readily formed with, e.g., a constant period of about 0.5 µm.

As noted, the period A of the interference pattern formed by the intersecting, actinic beams is expressed by the product $$\lambda \times 0.5 \, csc \frac{\phi}{2}.$$

In order to create a quasiperiodic grating having a desired spatial dependence, this product is varied while displacing the illuminated portion of the interference pattern by translating mirror 13. The product can be varied either by changing the wavelength λ, or by changing the intersection angle φ. The wavelength is readily varied if the source of the actinic radiation is a tunable laser. By way of illustration, excimer-pumped, frequency doubled, dye lasers are readily available that emit light over a practical range extending from about 235 nm to about 245 nm. At constant intersection angle, such an exposure source allows the grating period to be varied by as much as about 4% over the length of the grating.

As noted, the preferred interferometer can be used to displace the illuminated portion of the interference pattern without changing its phase; i.e., to displace it in such a way that its coherence is preserved. However, if the wavelength is changed during the displacement, the interference pattern will be coherent only over a short distance. Typical grating designs will call for a wavelength variation of only a fraction of one percent. Thus, the interference pattern, even with wavelength variation, will typically be coherent (to a good approximation) over many tens of grating periods. Such an interference pattern is referred to herein as "locally coherent."

One limitation on the chirping of gratings is imposed by the spot size of the interfering, actinic beams. If the Bragg wavelength changes too steeply over this distance, displacement of the spot will cause newly written portions of the grating to add incoherently to portions written just previously, leading to at least partial erasure of the grating. As through guideline, this can be avoided if the variation $\delta\lambda_B$ of the Bragg wavelength $\lambda_B$ over one spot size $L_{spot}$ satisfies the relation $$\frac{\delta \lambda_B}{\lambda_B} L_{spot} < 1/4\Lambda,$$

wherein Λ is the nominal grating period.

It is generally undesirable to vary the intersection angle, during actinic exposure, by rotating mirror 22. Mechanical coupling between the mirror bearings and the optical system can cause vibrations that unacceptably degrade the stability of the interference pattern. Moreover, the rotation that produces the required wavelength shift will often be too small to control in a practical way. However, there is a practical alternative to rotating mirror 22. That is, the intersection angle is readily varied by substituting a curved mirror for one of the planar mirrors of the optical system, as explained in more detail below.

Illustratively, an electromechanical actuator (the "translation actuator") is used to translate mirror 13, and a second electromechanical actuator (the "period-setting actuator") is used to change the tuning of the light source. A programmable controller, such as a microprocessor-based controller, is used to control both the translation actuator and the period-setting actuator. The controller is programmed provide the desired functional relationship between the period in each portion of the grating and the axial position of that portion.

Figure 2:
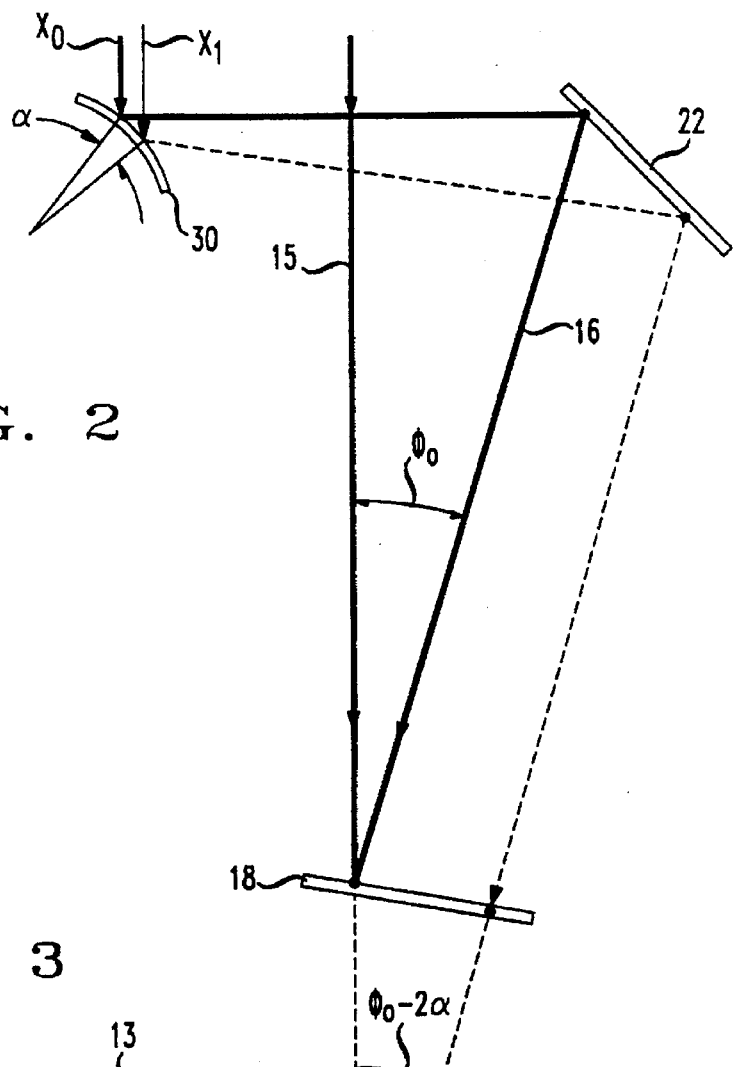
FIG. 2 is a portion of the optical diagram of FIG. 1. According to the invention in one embodiment, a curved mirror has been substituted for one of the planar mirrors of FIG. 1.

If the intersection angle is varied by including a curved mirror in the optical system, a chirped grating can be made in a simple way. The spatial dependence of the grating period is determined by the shape of the reflective surface of one of the mirrors in the optical system. As shown in FIG. 2, curved minor 30 can be substituted for, e.g., mirror 21 of the optical system. (The selection of mirror 21 for substitution is not unique. The curved mirror can be substituted for any of the planar mirrors in the optical system except for mirror 13.) If, for example, mirror 30 has a spherical convex or concave surface, the resulting interference pattern will have a chirp that is approximately linear.

With reference to FIG. 2, it is apparent that a translation of mirror 13 from $x_0$ to $x_1$ will turn beam 16 through an angle of $2\alpha$. The resulting change in the intersection angle between beams 15 and 16 will cause the local grating period to change as well. Thus, a chirped grating is formed simply by translating mirror 13 while exposing the photosensitive medium with a constant actinic wavelength. By way of illustration, a chirped grating can be made using a convex, spherical mirror having a radius of curvature of about 50 m. Assuming a grating having a nominal Bragg wavelength of 1.5 μm, we predict that a 1-cm displacement of mirror 13 will lead to a total shift of the Bragg wavelength of about 19 Å, or about 0.12%.

It should be noted that if the interfering beams are wide enough relative to the radius of curvature of mirror 30, a chirped grating can be made even without a translation of mirror 13. This is done by reflecting at least one of the beams from mirror 30. (The other beam is optionally reflected from a second curved mirror.)

Figure 3:
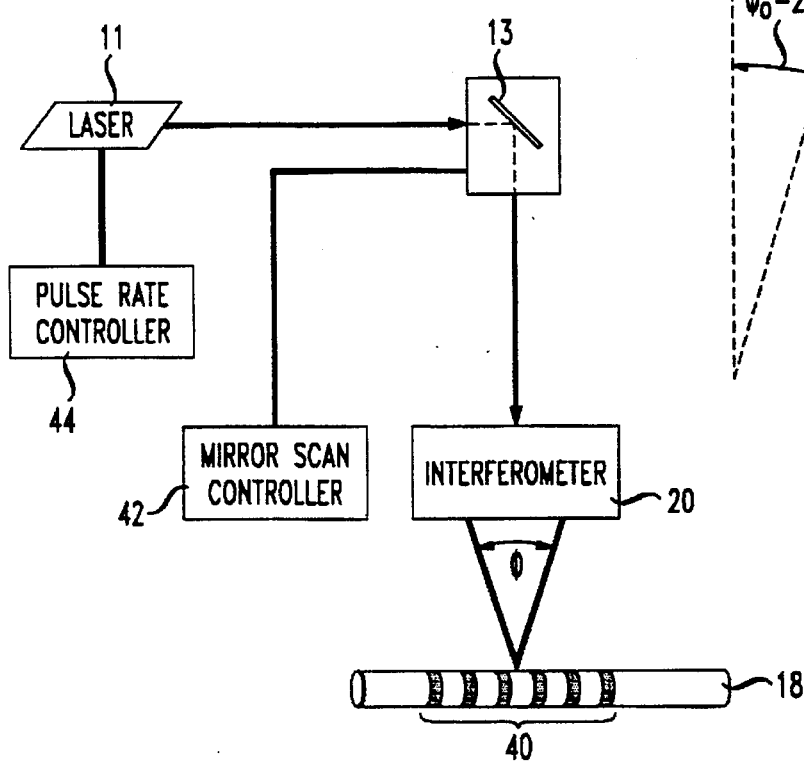
FIG. 3 is a block diagram of an illustrative system for practicing the invention, according to one embodiment. The system includes apparatus for controlling the dose of actinic radiation to the photosensitive medium.

The inventive method invites a further type of modification of the Bragg grating. That is, with reference to FIG. 3, the strength of grating 40 (i.e., the amplitude of the refractive index perturbation) is related to the duration and intensity of the actinic exposure. This strength can be modulated as a function of axial position by modulating the dose of actinic radiation. This dose is readily modulated by controlling (e.g., by controller 42) the translational velocity of mirror 13, by controlling the emissive intensity of light source 11, or (if source 11 is a pulsed light source) by controlling the pulse repetition rate of the light source. Of these three options, the last is currently preferred. That is, the repetition rate of, e.g., a pulsed, excimer-pumped, dye laser is readily controlled by programmable, microprocessor-based controller 44, to produce a Bragg grating having a specified average refractive, index profile. (By "average" profile is meant the spatially dependent refractive index averaged over many, exemplarily ten, grating periods.) Modification of the average refractive index profile is useful, inter alia, for improving the spectral characteristics of Bragg gratings. One such application is described, for example, in the previously cited, co-pending U.S. patent application filed by V. Mizrahi et al. under the title "Method for Forming Distributed Bragg Reflectors in Optical Media".

We claim:

1. Apparatus comprising a silica-based optical fiber having a core and a cladding, and a Bragg grating formed in the optical fiber, wherein: the core has a refractive index; the Bragg grating comprises a repetitive pattern of perturbations of said index; said perturbations are achieved by exposure of the core to actinic radiation; and said pattern has a period that varies approximately linearly with position along the optical fiber such that said period assumes values corresponding to a range of infrared Bragg wavelengths.

* * * * *